United States Patent [19]

Glaser et al.

[11] Patent Number: 5,399,955
[45] Date of Patent: Mar. 21, 1995

[54] POWER FACTOR IMPROVING ARRANGEMENT

[75] Inventors: Richard W. Glaser, Thornton; James L. McIntosh, Westminster, both of Colo.

[73] Assignee: AT&T Corp., Murray Hill, N.J.

[21] Appl. No.: 218,468

[22] Filed: Mar. 28, 1994

Related U.S. Application Data

[63] Continuation of Ser. No. 14,070, Feb. 5, 1993, abandoned, which is a continuation of Ser. No. 588,798, Sep. 27, 1990, abandoned.

[51] Int. Cl.$^6$ ............................................. G05F 1/70
[52] U.S. Cl. ........................................ 323/208; 323/209
[58] Field of Search ................. 323/208, 209, 210, 211

[56] References Cited

U.S. PATENT DOCUMENTS

| | | | |
|---|---|---|---|
| 2,976,481 | 3/1961 | Carpenter | 323/209 |
| 3,424,971 | 1/1969 | Stackegard | 321/18 |
| 3,906,337 | 9/1975 | Depenbrock | 321/10 |
| 4,412,277 | 10/1983 | Mitchell | 363/81 |
| 4,546,303 | 10/1985 | Maeda et al. | 323/210 |
| 4,622,474 | 11/1986 | Christl et al. | 307/105 |
| 4,672,522 | 6/1987 | Lesea | 363/48 |
| 4,719,402 | 1/1988 | Brennen et al. | 323/211 |
| 4,727,466 | 2/1988 | Sakai | 363/35 |
| 4,752,726 | 6/1988 | Aoyama | 323/207 |
| 4,769,587 | 9/1988 | Pettigrew | 323/209 |
| 4,903,181 | 2/1990 | Seidel | 363/16 |
| 4,914,559 | 4/1990 | Deisch | 363/48 |
| 4,916,377 | 4/1990 | Terada et al. | 323/210 |
| 4,970,656 | 11/1990 | Lo et al. | 364/481 |
| 5,099,190 | 3/1992 | Sato | 323/210 |

FOREIGN PATENT DOCUMENTS

| | | | |
|---|---|---|---|
| 1183895 | 4/1982 | Canada | 323/210 |
| 0438059 | 7/1991 | European Pat. Off. | A02J 3/18 |
| 8704538 | 7/1987 | WIPO | G05F 1/70 |

OTHER PUBLICATIONS

Erchz, M., *Improvement of the Performance of Electric Power Systems*, IEEE/CSEE Joint Conference on High-Voltage Transmission Systems in China. Oct. 17–22, 1987, BeiJing, China, pp. 252–257.

Koetsch, P., "Active power-factor correction", *Electronic Engineering Times*, Jun. 18, 1990, pp. 54–55.

*Primary Examiner*—Steven L. Stephan
*Assistant Examiner*—Adolf Berhane
*Attorney, Agent, or Firm*—John C. Moran

[57] ABSTRACT

An impedance compensator for adjusting the power factor of a power distribution system by directly measuring impedance at a point in the power distribution system and dynamically adjusting that impedance to be resistive yielding a power factor of one. The compensator dynamically inserts and removes both capacitance and inductance to adjust the impedance. The inductance is utilized to make coarse adjustments to the impedance, whereas the capacitance is utilized to make fine adjustments.

17 Claims, 3 Drawing Sheets

POWER FACTOR IMPROVING ARRANGEMENT

This application is a continuation of application Ser. No. 08/014,070, filed on Feb. 5, 1993, now abandoned, which is a continuation of application Ser. No. 07/588,798, filed on Sep. 27, 1990, now abandoned.

TECHNICAL FILED

The present invention relates to power systems and, in particular, to power factor correction in such systems.

BACKGROUND OF THE INVENTION

A power factor is a measure of the efficiency of power passing through a point in a power distribution system and is the ratio of the average power, or true power, measured in watts, to the apparent power. The apparent power is the input RMS voltage multiplied by the input RMS current. Power is distributed most efficiently when the actual power delivered to a load equals the apparent power, i.e., when the power factor equals unity. When the power factor is unity at a given point in the power distribution system, the impedance at that point is purely resistive.

Electronics systems use power converters to supply the electrical power requirements of these systems. The typical power factor values for power converters range from about 0.75 to less than 0.5. Such power converters are typically of two types. The first type operates directly off of A.C. lines and directly rectifies the line voltage and stores the resulting D.C. voltage on large input capacitors to which a load is directly connected. As consequence, this type of power converter draws current from the A.C. lines in narrow but large current pulses, thereby yielding a poor power factor. The second type of converter is a switching power converter. This converter is similar to the first type of converter but uses a switch to transfer power from the input capacitors to the load.

A low power factor is compensated for by high current being drawn by the converter from the A.C. power distribution system in order to supply sufficient power to a load. This type of operation has four major problems: (1) the need for larger-capacity and more robust A.C. power distribution system components (e.g., circuit breakers, transformers, and wiring) that are capable of handling the power converter's high RMS current demands, (2) the need for larger and more robust components in the power converter, (3) the communication of high frequency noise into the A.C. line from the power converter, and (4) higher power costs to the user of the electronic system resulting from the electrical power costs being based on the apparent power, not the real power. In addition, harmonic distortion of the A.C. power distribution system increases as the power factor of a power converter decreases. This is an important fact for a company planning on marketing a product in Western Europe, since harmonic distortion standards will become effective in Western Europe in 1992. There is movement in the United States and Canada to enact similar standards.

The prior art does provide circuits for power factor compensation. For example, U.S. Pat. No. 4,914,559 provides passive power factor correction for the first type of power converter by using an L-C circuit connected in series between the power converter and the A.C. power source for the power converter. The inductance and capacitance components are fixed in that circuit.

U.S. Pat. No. 4,412,277 provides active power factor compensation for the second type of power converter as integral part of a switching power converter. In that patent, the disclosed power converter converts A.C. power to D.C. power in response to a control signal. The control signal is generated by a control circuit that generates a first signal representing the A.C. voltage, a second signal representing the A.C. current, a third signal representing the D.C. output voltage of the power converter, and a fourth signal that is obtained by multiplying the first signal by the third signal. The control signal is then determined from the second and fourth signals. The control signal controls the power converter such that the waveform of the A.C. current is limited to a sinusoidal waveform of the same frequency and phase as the A.C. voltage.

The article entitled "Active Power-Factor Correction", by P. Koetsch, *Electronic Engineering Times*, p.54–55, Jun. 18, 1990, discloses a power factor compensator that is an integral part of the second type of power converter. This circuit is called a boost circuit and performs a fixed operation every cycle of the A.C. power. The boost circuit maintains a symmetric current drawn by shorting the A.C. system through an inductance during a portion of the A.C. cycle. The boost circuit is expensive and has to be designed for a specific load.

The problems with prior art power factor compensators are that these circuits either perform only fixed power factor compensation or must be an integral part of the power converter if performing active power factor compensation. Further, active power factor compensation circuits of the prior art are overly complicated and do not address the compensation problems directly.

SUMMARY OF THE INVENTION

The foregoing problems are solved and a technical advance is achieved by an impedance compensator that directly measures impedance at a point in the power distribution system and dynamically adjusts that impedance to be resistive yielding a power factor of unity. In a preferred embodiment, the compensator dynamically inserts and removes both capacitance and inductance to adjust the impedance. The inductance is utilized to make coarse adjustments to the impedance, whereas the capacitance is utilized to make fine adjustments.

In a specific embodiment of the invention disclosed herein, the impedance compensator interfaces to the power distribution system using a transformer that reflects the impedance of the power distribution system into a phase shift oscillator. The latter oscillator generates a center frequency if the impedance is resistive, a frequency higher than the center frequency of the impedance is capacitive, and a frequency lower than center frequency if the impedance is inductive. A frequency-to-voltage converter converts the output of the oscillator to a voltage. In response to that voltage, an error amplifier generates a signal used by a capacitance controller to control the amount of capacitance contributed by the impedance compensator to the power distribution system. Also, in response to that voltage, a set amplifier and reset amplifier provide set and reset signals to an inductance controller upon the voltage being a preset voltage below a center frequency voltage corresponding to the center frequency and another preset voltage above the center frequency voltage, respectively. In response to the set signal, the inductance controller enables one of a plurality of inductance components resulting in more inductance being contributed to the power distribution system; and in response to the reset signal, the inductance controller disables one of the plurality of inductance components resulting in less inductance being contributed to the power distribution system.

In accordance with a feature of the invention, each inductance component has an electrically actuated switch in parallel with it. The inductance controller enables an inductance component by opening its switch. When no electricity is applied to the impedance compensator, all of switches are open. Upon application of electricity to impedance compensator, the switches remain open for a fixed time period preventing an initial surge current, since all of the inductance components are enabled.

DETAILED DESCRIPTION

Figure 1:
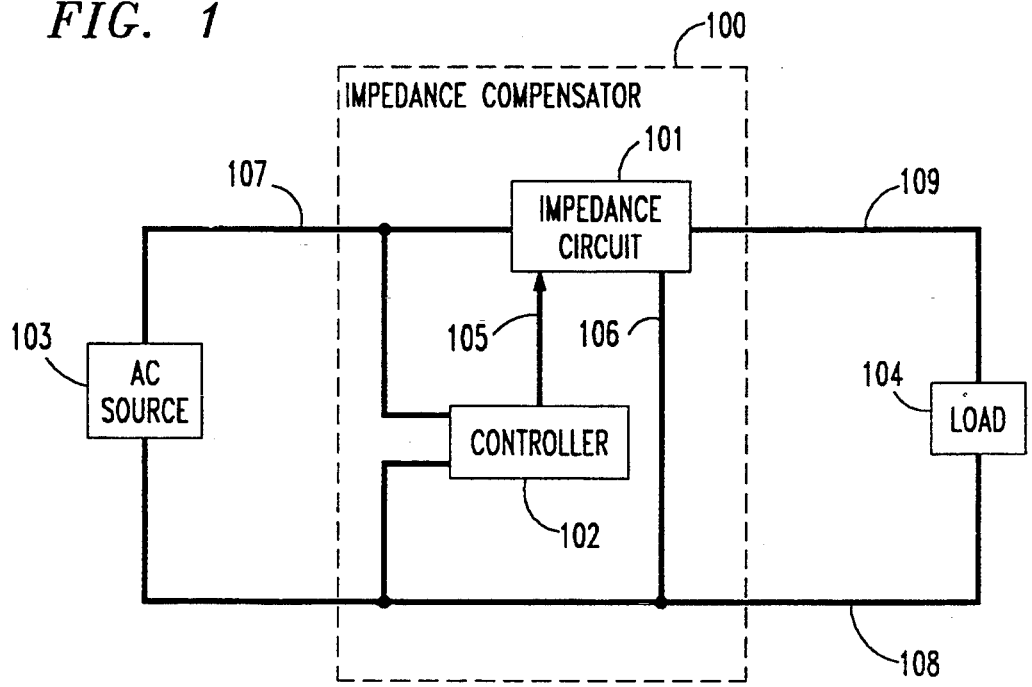
FIG. 1 illustrates, in block diagram form, a impedance compensator in accordance with the invention.

FIG. 1 illustrates impedance compensator 100 which is an illustrative embodiment of the invention. Compensator 100 is interconnected with AC source 103 via conductors 107 and 108 and to load 104 via conductors 109 and 108. AC source 103 may be a conventional AC power source or may be an uninterruptible power source (UPS) also referred to as a AC standby power unit. In accordance with the invention, compensator 100 adjusts its impedance such that the power factor seen by AC source 103, in turn, is adjusted. Load 104 may advantageously be a switching power supply. AC source 103, compensator 100, and load 104 form a power distribution system. In accordance with a feature of the invention, compensator 100 functions by controller 102 responding to the impedance of both AC source 103 and load 104 to supply control signals via cable 105 to impedance circuit 101. In response to the control signals received via cable 105, impedance circuit 101 adjusts the impedance presented to AC source 103 such that the power factor has a predetermined value. The predetermined value may advantageously be approximately one.

Figure 2:
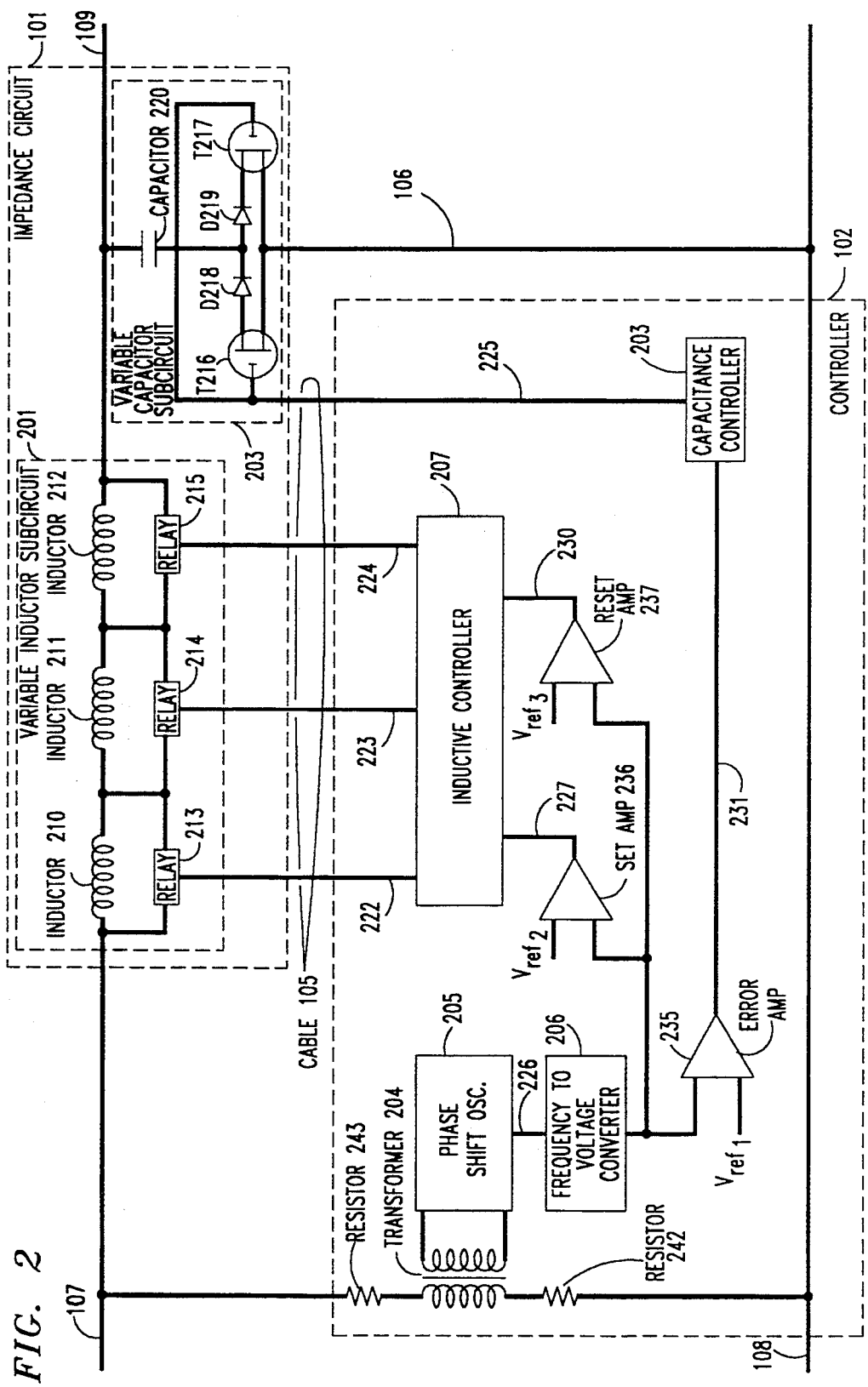
FIG. 2 illustrates in greater detail the impedance compensator in accordance with the invention.

FIG. 2 illustrates in greater detail controller 102 and impedance circuit 101 of FIG. 1. The impedance across lines 107 and 108 is sensed by transformer 204 in series with resistors 242 and 243, phase shift oscillator 205, frequency-to-voltage converter 206, and amplifiers 235 through 237. The outputs of amplifiers 236 and 237 are utilized by inductive controller 207 to control variable inductor subcircuit 201 within impedance circuit 101. Variable inductor subcircuit 201 allows a variable amount of inductance to be inserted between lines 107 and 109. Capacitance controller 203 is responsive to the output of amplifier 235 to control variable capacitor subcircuit 202 within impedance circuit 101. Variable capacitor subcircuit 202 determines the amount of shunt capacitance that is inserted between lines 109 and 108.

By controlling variable inductor subcircuit 201 and variable capacitor subcircuit 202, the impedance between lines 107 and 108 is adjusted such that the power factor can be made to approach unity in accordance with the invention.

The impedance across lines 107 and 108 is reflected by transformer 204 into the phase shift inputs of phase shift oscillator 205. When the impedance is only resistive, phase shift oscillator 205 operates at a center frequency which advantageously may be 100 kHz. If the impedance reflected into phase shift oscillator 205 is capacitive, the frequency of oscillator 205 increases above the center frequency. Similarly, if the impedance reflected into oscillator 205 is inductive, the frequency of oscillator 205 decreases below the center frequency. The frequency generated by oscillator 205 is transmitted to converter 206 via conductor 226. Converter 206 converts this frequency to a voltage and transmits that voltage to amplifier 235. The transmitted voltage represents the reactive component of the reflected impedance. If the reflected impedance is only resistive, converter 206 generates a center voltage, $V_{ref1}$, which corresponds to the center frequency of 205. If the frequency of oscillator 205 is greater than the center frequency, the voltage output of converter 206 is in a voltage range that is higher than $V_{ref1}$. If the frequency of oscillator 205 is lower than the center frequency, the voltage output of converter 206 is a voltage range lower than $V_{ref1}$.

With respect to control of variable inductor subcircuit 201, if the output of the converter 206 is lower than a predetermined voltage, $V_{ref2}$, set amplifier 236 transmits a signal via conductor 227 to inductive controller 207. $V_{ref2}$ is a predetermined absolute voltage distance from $V_{ref1}$. In response to the signal on conductor 227, inductive controller 207 transmits signals on lines 222 through 224 to cause variable inductor subcircuit 201 to insert additional inductance into the path between conductor 107 and conductor 109. If the output of converter 206 is higher than a predetermined voltage, $V_{ref3}$, reset amplifier 237 transmits a signal via conductor 230 to inductive controller 207. $V_{ref3}$ is a predetermined absolute voltage distance from $V_{ref1}$. In response, inductive controller 207 controls variable inductor subcircuit 201 to remove inductance between conductors 107 and 109.

With respect to control of variable capacitor subcircuit, if the output of converter 206 is less than $V_{ref1}$, error amplifier 235 transmits a voltage signal via conductor 231 to capacitance controller 203. In response, capacitance controller 203 controls variable capacitor subcircuit 202 to remove capacitance between conductors 206 and 109. If the voltage transmitted by converter 206 is greater than $V_{ref1}$, capacitance controller 203 controls variable capacitor subcircuit 202 to add capacitance.

Variable capacitor subcircuit 202 comprises capacitor 220, transistors T216 and T217, and diodes D218 and D219. The transistors and diodes form a bi-directional switch. A variable capacitance is achieved by switching capacitor 220 by using transistors 216 and 217 and diodes 218 and 219 under control of a pulse width modulated signal. Capacitance controller 203 transmits the pulse width modulated signal on conductor 225 using well known techniques to convert the voltage signal on conductor 231 to the pulse width modulated signal. By utilizing a pulse width modulated signal to control the transistors, the variable capacitance of variable capacitor subcircuit 202 can be adjusted from the full value of capacitor 220 to a value approaching zero.

Variable inductor subcircuit 201 is formed by inductors 210, 211, and 212 and relays 213, 214 and 215. The relays have normally open contacts. If the contacts are closed, the corresponding inductor is shorted out and adds no inductance to the overall sum of inductance for variable inductor subcircuit 201. For example, if inductive controller 207 is transmitting a signal on conductor 222, relay 213 is activated and shorts out inductor 210 which removes inductor 210 from the inductance of variable inductor subcircuit 201. Advantageously, although only three inductors are illustrated, any number of inductors can be utilized in variable inductor subcircuit 201. As illustrated, variable inductor subcircuit 201 can have the sum of inductance from inductors 210, 211, and 212 or any partial sum of inductance from inductors 210, 211, and 212, or zero.

When electricity is not being supplied by AC source 103, contacts for relays 213, 214 and 215 are open resulting in inductors 210, 211, 212 being in series between AC source 103 and load 104. When electricity is initially applied, inductors 210, 211, 212 prevent a surge of current from flowing into load 104.

Figure 4:
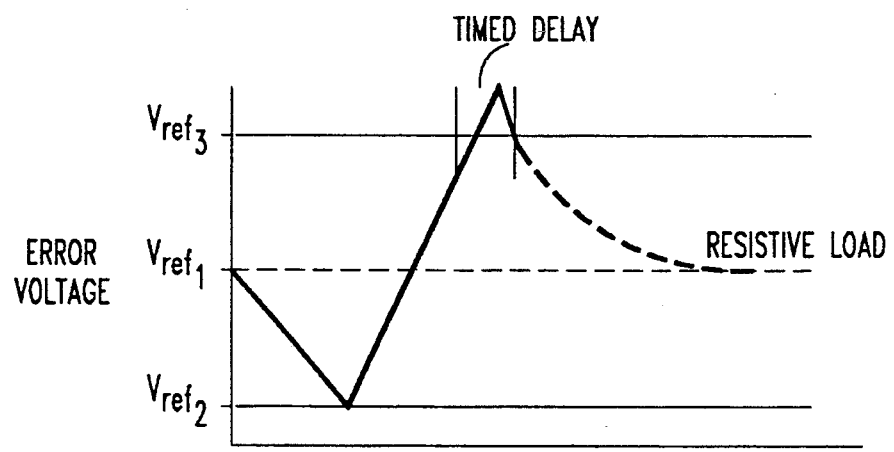
FIG. 4 depicts voltage levels utilized in the operation of the impedance compensator.

FIG. 4 illustrates the threshold voltages at which inductive controller 207 and capacitance controller 203 operate. Center voltage ($V_{ref1}$) represents the voltage output of converter 206 when transformer 204 is reflecting a purely resistive load into oscillator 205. As the impedance reflected by transformer 204 becomes capacitive, the voltage starts to decrease towards $V_{ref2}$. If the impedance becomes inductive, the voltage starts to :increase towards $V_{ref3}$. Since inductive controller 207 can only insert discrete amounts of inductance utilizing variable inductor subcircuit 201, capacitance controller 203 performs a fine adjustment of the inserted impedance. Inductive controller 207 only inserts discrete amounts of inductance when capacitive controller 203 can no longer maintain a reflected resistive impedance.

Consider the following example. If load 104 starts to have an increased capacitive component, the voltage generated by converter 206 shifts towards $V_{ref2}$ of FIG. 4. As the capacitive component increases, capacitive controller subcircuit 203 corrects for this increase by reducing the amount of capacitance introduced by variable capacitor 203. If the capacitive component of load 104 continues to increase, a point is reached where capacitive controller 203 has adjusted variable capacitor subcircuit 202 to have zero capacitance. At this point, set amplifier 236 responds to the output of error amplifier 235 to transmit a signal via conductor 227. In response to the signal on conductor 227, inductive controller 207 inserts inductance via variable inductor subcircuit 201. Inductive controller 207 continues to insert inductance until the voltage output of converter 206 as monitored by set amplifier 236 becomes greater than $V_{ref2}$.

If load 104 now reduces its capacitive component, the output voltage of converter 206 becomes greater than $V_{ref1}$. Capacitive controller 203 is responsive to this change in voltage to adjust variable capacitor subcircuit 202 to introduce capacitance. If the reduction in the capacitive component of load 104 continues, capacitive controller 203 inserts the full amount of capacitance available from variable capacitor subcircuit 202. At this point, the output voltage of converter 206 exceeds $V_{ref3}$. When this occurs, reset amplifier 237 transmits a signal via conductor 230 to inductive controller 207. In response to this signal, inductive controller 207 removes inductance inserted by variable inductor subcircuit 201.

Figure 3:
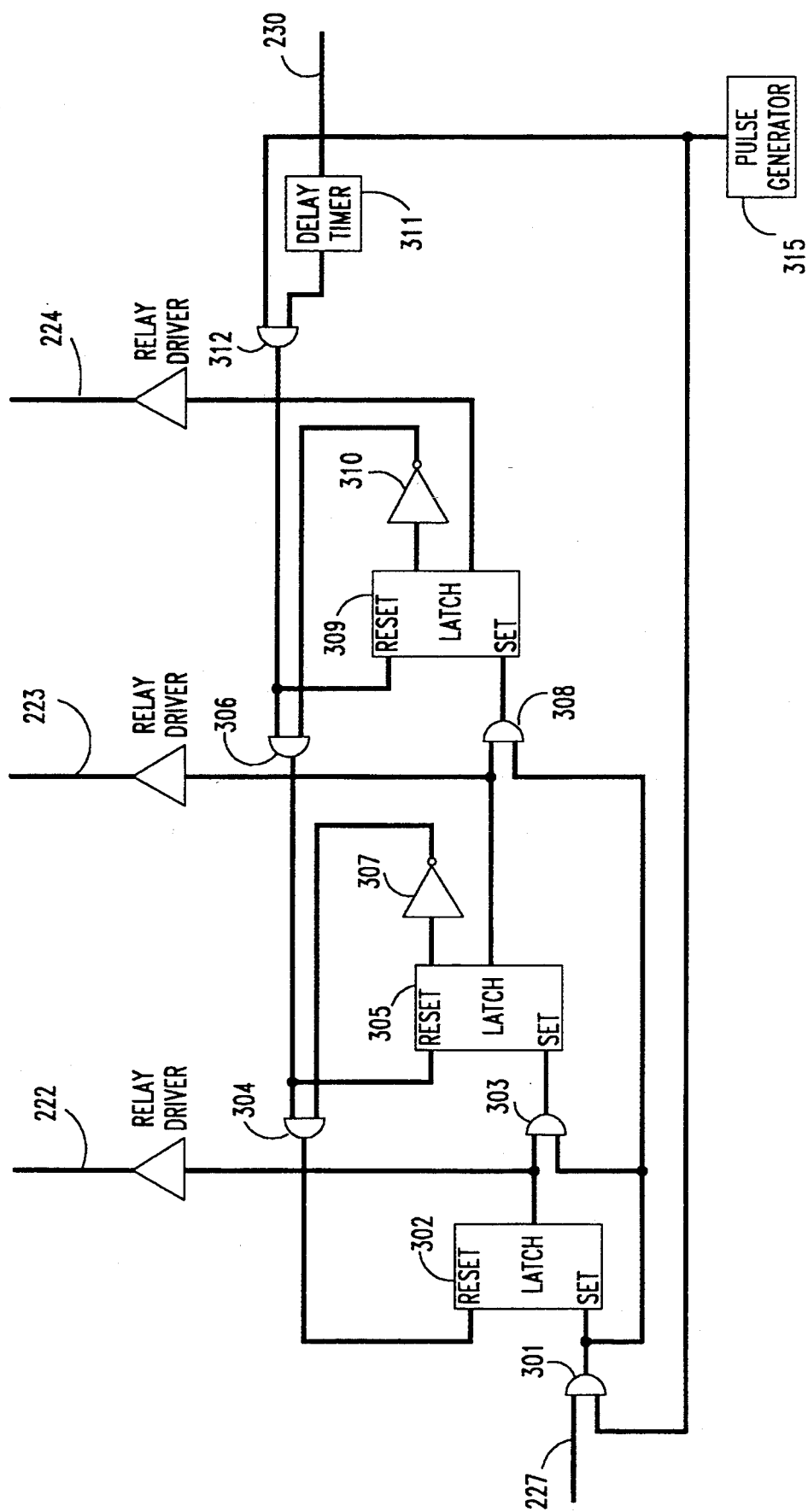
FIG. 3 illustrates in greater detail a relay controller.

Inductive controller 207 is illustrated in greater detail in FIG. 3. Relays 213, 214 and 215 are controlled by latches 302, 305, and 309, respectively, via relay drivers. As inductance is initially required, latch 302 is set via AND gate 301. If additional inductance is required, latch 305 is set via AND gate 303. Finally, latch 309 is set via AND gate 308. The set signal, which is received via conductor 227, is logically ANDed by AND gate 301 with the output of a pulse generator 315. The period between pulses generated by pulse generator 315 is equal to the time required for a relay to open or close. Inductance is removed from the circuit by resetting the latches via AND gates 304, 306, and 312. Delay time 311 delays the reset signal received on conductor 230 in order to give capacitive controller 203 an opportunity to add more capacitance.

It is to be understood that the above-described embodiments are merely illustrative of principles of the invention and that other arrangements may be devised by those skilled in the art without departing from the spirit or scope of the invention. In particular, other circuits for adjusting inductance and capacitance could readily be devised by those skilled in the art.

We claim:

1. Apparatus for adjusting a power factor in a power distribution system, comprising:
   means for continuously determining an impedance of said power distribution system;
   means for convening said impedance of said power distribution system to a voltage representing said impedance;
   means responsive to said voltage for indicating whether said impedance is capacitive, inductive, or resistive;
   means for controlling an amount of capacitance in parallel with said power distribution system to adjust said impedance to be substantially resistive resulting in said power factor being substantially unity with said capacitance having a predetermined maximum and minimum values; and
   means for controlling an amount of inductance in series with said power distribution system to adjust said impedance to be substantially resistive resulting in said power factor being substantially unity upon said predetermined maximum or minimum values of capacitance having been exceeded.

2. The apparatus of claim 1 wherein said capacitance controlling means continuously controls the amount of said parallel capacitance.

3. The apparatus of claim 1 wherein said inductance controlling means comprises a plurality of inductive components;
   an inductance controller responsive to said capacitance being at said predetermined minimum value for inserting one of said inductive components whereby said amount of inductance inserted in series with said power distribution system is increased; and
   said inductance controller further responsive to said capacitance being at said predetermined minimum value for removing one of said inductive components whereby said amount of said inductance inserted in series with said power distribution system is decreased.

4. Apparatus for adjusting a power factor in a power distribution system, comprising:

means for continuously determining an impedance of said power distribution system;

a transformer for reflecting said impedance;

an oscillator responsive to said reflected impedance for generating a frequency representing said impedance;

a frequency-to-voltage converter responsive to said frequency for generating said voltage;

means responsive to said voltage for indicating whether said impedance is capacitive, inductive, or resistive; and means for adjusting said impedance to be substantially resistive resulting in said power factor being substantially unity.

5. The apparatus of clam 4 wherein said indicating means comprises an error amplifier responsive to said voltage for generating an error voltage such that said error voltage is substantially equal to a predetermined center voltage upon said impedance being resistive and said error voltage being shifted to a first voltage range from said predetermined center voltage upon said impedance being capacitive and said error voltage being shifted to a second voltage range from said predetermined center voltage upon said impedance being inductive.

6. The apparatus of claim 5 wherein said adjusting means comprises means for controlling the amount of capacitance contributed to said impedance by said apparatus such that said capacitance controlling means responsive to said error voltage being in said first voltage range to reduce the contributed capacitance and responsive to said error voltage being in said second voltage range to increase the contributed capacitance.

7. The apparatus of claim 6 wherein said indicating means further comprises a set amplifier responsive to said voltage being equal to or greater than a first predetermined absolute voltage value from said error voltage in said second voltage range for generating a set signal;

a reset amplifier responsive to said voltage being equal to or greater than a second predetermined absolute voltage value from said error voltage in said first voltage level for generating a reset signal;

said adjusting means further comprises an inductance controlling means to control inductance contributed by said apparatus to said impedance for increasing inductance in response to said set signal; and said inductance controlling means further responsive to said reset signal for decreasing the amount of inductance contributed to said impedance by said apparatus.

8. The apparatus of claim 7 wherein said inductance controlling means comprises a plurality of inductive components;

an inductance controller responsive to said set signal for inserting one of said inductive components to increase the amount of inductance contributed to said impedance; and said inductance controller further responsive to said reset signal for removing one of said inductive components to decrease the amount of inductance contributed to said impedance.

9. The apparatus of claim 8 wherein said inductance controlling means further comprises electrically actuated switches each individually connected in parallel with one of said inductive components;

said inductance controller inserts said one of said inductive components by opening the electrically actuated switch connected in parallel and removes said one of said inductive components by closing said connected electrically actuated switch; and said electrically actuated switches are open in the absence of electricity in said power distribution system resulting in all of said inductive components being inserted upon electricity initially being applied to said power distribution system which limits the surge of electrical current with said power distribution system.

10. A method for adjusting a power factor in a power distribution system, said method comprising the steps of:

continuously determining an impedance of said power distribution system;

converting said impedance of said power distribution system to a voltage representing said impedance;

indicating in response to said voltage whether said impedance is capacitive, inductive, or resistive;

controlling an amount of capacitance in parallel with said power distribution system to adjust said impedance to be substantially resistive resulting in said power factor being substantially unity with said capacitance having a predetermined maximum and minimum values; and controlling an amount of inductance in series with said power distribution system to adjust said impedance to be substantially resistive resulting in said power factor being substantially unity upon said predetermined maximum or minimum values of capacitance having been exceeded.

11. The method of claim 10 wherein said capacitance controlling step continuously controls the amount of said parallel capacitance.

12. The method of claim 10 wherein said inductance controlling step comprises the steps of inserting one of a plurality of inductive components in response to said capacitance being at said predetermined minimum value whereby said amount of inductance inserted in series with said power distribution system is increased; and removing one of said inductive components in response to said capacitance being at said predetermined minimum value whereby said amount of said inductance inserted in series with said power distribution system is decreased.

13. A method for adjusting a power factor in a power distribution system, said method comprising the steps of:

continuously determining an impedance of said power distribution system;

reflecting said impedance with a transformer;

generating a frequency representing said impedance by an oscillator responsive to said reflected impedance;

generating said voltage by a frequency-to-voltage converter responsive to said frequency;

indicating in response to said voltage whether said impedance is capacitive, inductive, or resistive; and adjusting said impedance to be substantially resistive resulting in said power factor being substantially unity.

14. The method of claim 13 wherein said indicating step comprises the step of generating an error voltage with an error amplifier responsive to said voltage such that said error voltage is substantially equal to a predetermined center voltage upon said impedance being resistive and said error voltage being shifted to a first voltage range from said predetermined center voltage upon said impedance being capacitive and said error voltage being shifted to a second voltage range from said predetermined center voltage upon said impedance being inductive.

15. The method of claim 14 wherein said adjusting step comprises the step of controlling the amount of capacitance contributed to said impedance by said method such that said capacitance controlling responsive to said error voltage being in said first voltage range to reduce the contributed capacitance and responsive to said error voltage being of said second voltage range to increase the contributed capacitance.

16. The method of claim 15 wherein said indicating step further comprises the steps of generating a set signal with a set amplifier responsive to said voltage being equal to or greater than a first predetermined absolute voltage value from said error voltage in said second voltage range;

generating a reset signal with a reset amplifier responsive to said voltage being equal to or greater than a second predetermined absolute voltage value from said error voltage in said first voltage level;

said adjusting step further comprises the step of controlling inductance contributed by said method to said impedance for increasing inductance in response to said set signal; and said inductance controlling step further responsive to said reset signal for decreasing the amount of inductance contributed to said impedance by said method.

17. The method of claim 16 wherein said inductance controlling step comprises the steps of inserting one of a plurality of inductive components in response to said set signal to increase the amount of inductance contributed to said impedance; and removing one of said inductive components in response to said reset signal to decrease the amount of inductance contributed to said impedance.

* * * * *